United States Patent Office 3,598,647
Patented Aug. 10, 1971

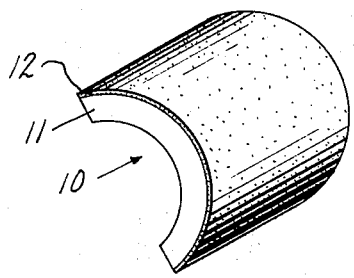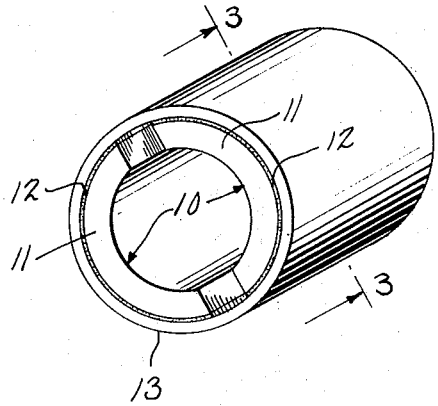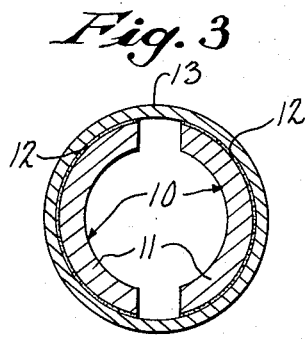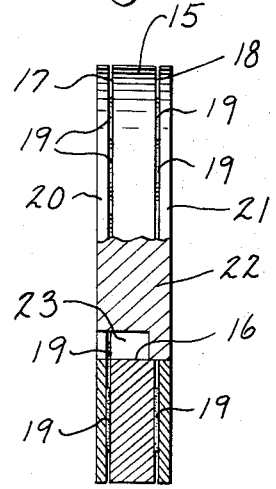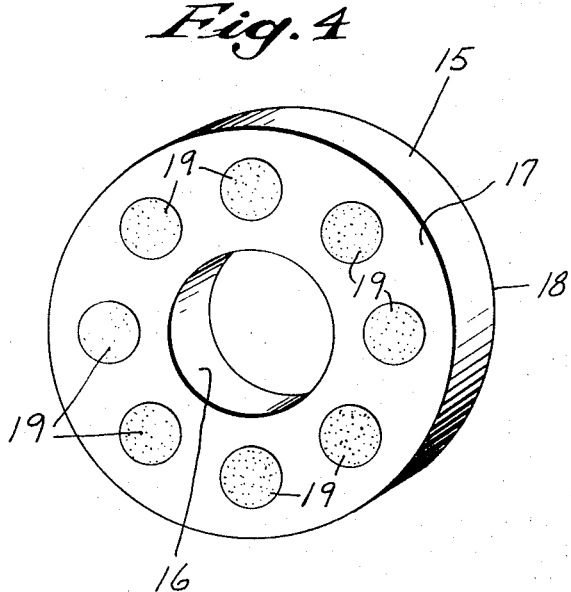

3,598,647
ADHESIVE COATED FERRITE MAGNETS
Theodor von Alten, Glendale, Gerald L. Peebles, Milwaukee, and James G. Battige, Menomonee Falls, Wis., assignors to Allen-Bradley Company, Milwaukee, Wis.
Filed Oct. 10, 1968, Ser. No. 766,420
Int. Cl. H01f 1/34
U.S. Cl. 117—234                                                    6 Claims

ABSTRACT OF THE DISCLOSURE

Ferrite magnets with a coating, which may be continuous or discontinuous, of a dry, solid partially-cured adhesive so that the magnets can be attached to other articles, such as magnetic steel members, by final cure of the adhesive coating upon the application of heat and pressure. Particularly effective adhesive coating compositions and methods for their application to ferrite magnets are also disclosed.

BACKGROUND OF THE INVENTION (1) Field of the invention

The particular technology to which this invention pertains is that of joining ferrite magnets to other members of a magnetic assembly without the use of mechanical fastening devices.

(2) Descritpion of the prior art

Many magnetic assemblies include one or more magnets which must be affixed to metal elements, a typical example being an electric motor having permanent magnets joined to magnetic steel motor field rings. When ceramic (i.e. ferrite) magnets are employed in such assemblies, particular problems are presented by the usual prior art attachment methods.

One of the known techniques involves the use of mechanical fasteners such as springs or clips to hold the ferrite magnet to the other elements. This causes the problem of chipping and cracking the brittle ceramic ferrite magnets, particularly around the corners and edges, because such fasteners apply force over small areas to produce localized areas of high stress within the magnet. A further disadvantage is that, although the force on certain areas of the magnet is quite high, the overall strength of the assembly is relatively low, and is subject to deterioration with time due to stress relief within the spring material usually employed in mechanical fasteners.

Another prior art mode for attaching ferrite magnets to other components is the application of paste adhesives to bond the ferrite to its associated element. Paste adhesives are capable of forming high strength bonds when applied and cured properly, and overcome the problem of localized stressing of the ceramic magnet associated with mechanical fasteners. However, because of their semi-liquid nature, paste adhesives present problems with application, handling, assembling and clean-up. Also, the adhesive must be cured almost immediately after it is applied to the ferrite magnet to avoid contamination by dust or moisture. Because it is not possible to stock or store ceramic magnets with pre-applied paste adhesive, application of the adhesive and assembly of the components must be performed as closely-related operations.

A third prior art method is to apply bonding films to the magnet which will form adhesive bonds with other components. The bonding films can be die cut and taped or otherwise joined to the magnet; the magnet with its attached bonding films can be stored for final assembly at a later date. Most bonding films are dry to the touch and thereby overcome the handling and application problems of paste adhesives. A disadvantage of the use of bonding films is that they generally exhibit poor void filling and flow characteristics for use in magnetic assemblies. Furthermore, bonding films usually require high cure pressures of 75 to 150 p.s.i. before they will soften and flow properly. Most of them have a short shelf life, so that it is not possible to stock a long-term inventory of the magnets with the film attached. Other disadvantages are that most bonding films include material of relatively high cost and require sophisticated and specialized machinery for high volume assembly work.

SUMMARY OF THE INVENTION

The present invention provides ferrite magnets which include a dry, solid adhesive coating on the magnet surfaces which are to be joined to other articles in which the adhesive coating provides for easy handling, shipping, storage and assembly of the ferrite components. Ferrite magnets carrying the adhesive coatings of the present invention exhibit increased shelf or storage life as compared to other prior art techniques, such as those employing bonding films for example. The adhesive coating on the magnets is caused to melt and flow during assembly, upon the application of suitable heat and pressure, so that the adhesive will evenly fill voids of the ceramic magnets under conditions of relatively low applied pressure. An adhesive bond of high strength is accomplished with the adhesive coating of this invention. Furthermore, the coated magnets can be stored for a substantial length of time, up to one year or so, so that a suitable inventory of the coated magnets can be maintained by the assembler and used as necessary.

According to the present invention, the adhesive coating is solid and non-tacky and contains, as an essential ingredient, certain types of epoxy resins formed by the reaction of an epihalohydrin with a bisphenol that are solid at room temperature (defined herein as 75° F.) and have a softening point of 40° C. or higher. The coating includes a curing agent for the epoxy resin, and also may contain a filler, a thixotropic agent and an anti-caking compound. When first applied to the ferrite, the adhesive is in a partially-cured stage, but is solid and non-tacky, and final cure to a thermoset adhesive is obtained upon the application of heat and relatively low pressure.

DESCRIPTION OF THE DRAWINGS

The ensuing description sets forth, for the purposes of illustration and not of limitation, several examples of presently-preferred embodiments of this invention. Not all possible embodiments in which the invention may be practiced are described, however, and other forms of adhesive coated ferrite articles within the scope of the present invention will be suggested to those skilled in the art by this description, which is made with reference to the accompanying drawings, wherein:

FIG. 1 is a perspective view of a ferrite magnet carrying an adhesive coating in accordance with this invention;

FIG. 2 is a perspective view illustrating two coated magnets of FIG. 1 assembled in a cylindrical steel shell;

FIG. 3 is a sectional view taken along the plane of line 3—3 of FIG. 2;

FIG. 4 is a perspective view illustrating another magnet with an adhesive coating according to this invention; and FIG. 5 is a view, with a portion broken away, illustrating the magnet of FIG. 4 assembled with a pair of outer rings to form a speaker magnet assembly.

DESCRIPTION OF THE PREFERRED EMBODIMENTS

FIG. 1 illustrates a ferrite magnet 10 comprising a ferrite permanent magnetic body 11 formed as an arc sector and a coating 12 of a dry, solid non-tacky adhesive on its exterior curved surface.

FIG. 2 illustrates a typical use of a magnet 10 wherein two such magnets are bonded along the interior of a steel cylinder 13 to thereby form a permanent magnet field such as commonly used for electric motors, generators and alternators; as best shown in FIG. 3, each magnet 10 is joined to the inner surface of the steel cylinder 13 along its respective adhesive coating 12.

FIGS. 4 and 5 depict another magnetic assembly utilizing magnetic articles according to the present invention comprising, turning first to FIG. 4, a ferrite magnet 15 in the form of a ring magnet having a central aperture 16 and carrying a discontinuous adhesive coating on its side surfaces 17 and 18, which coating is shown as comprising spaced discs or islands 19 of adhesive of the composition specified below. The magnet 15 is shown in a magnetic assembly in FIG. 5 wherein magnetic steel rings 20 and 21 are joined to the sides 17 and 18 respectively of the magnet 15 along the adhesive areas 19 carried on each side of the ferrite magnets. A pin 22 is inserted in the central aperture 16 of the magnet, and a voice coil not shown, would be inserted in the annular gap 23 between the pin 22 and the aperture of the magnet so that the entire assembly could be used as a driver magnet assembly for loudspeaker cones. Other typical uses of the magnetic assembly as shown in FIG. 5 include ring magnets for alternators, torque drives and clutches.

The adhesive for the coatings 12 and 19 on the ferrite magnetic articles shown in the drawings must have particluar properties for the purposes of this invention. As stated previously, the adhesive is to be dry and non-tacky at room temperature, have a long shelf life and be in a partially-cured stated when first applied to the ferrite body. The adhesive is to be curable to fully-cured stage upon the application of heat and relatively low pressure under about 15 p.s.i. Because ferrite magnets are relatively fragile and brittle as compared to magnetic steel elements for example, the adhesive must be capable of bonding to magnetic steel (usually mild steel, soft steel or cold-roled steel) at 15 p.s.i. or under, and particularly in the range of about 2 to 15 p.s.i. Further, the adhesive must have excellent flow and wetting characteristics in order to form a good bond with the other elements to which the magnet is to be affixed, and must possess excellent void-filling properties in order to be useful with the ceramic ferrite magnets. The ability of an adhesive to flow and fill voids is particularly important since neither the ceramic magnets nor the magnetic steel shells can be machined to fit exactly, and gaps of 0.005 inch or more between the two are not uncommon. If the gaps are completely filled by the adhesive, stress loads are distributed evenly over the entire joined area to thereby reduce chances of bond failure.

We have found that all of these characteristics can be obtained by the use of selected types of epoxy resins as an essential ingredient of the adhesive. Specifically, the epoxy resin is to be solid at room temperature, have a softening point of 40° C. or higher (which will include epoxy resins with a molecular weight of at least about 750 and above) and is to be formed by the reaction of an epihalohydrin with a bisphenol. Epichlorohydrin is the most widely used epihalohydrin, although others, including dihalohydrins, may be employed. Bisphenol A is the most commercially available bisphenol, although others may be used within the criteria set forth above. The coatings may also contain solid epoxies formed by reacting an epihalohydrin with novolac resins and polynuclear phenols in combination with the class of bisphenol epoxies as above-defined.

The adhesive is to include a curing agent for the epoxy resin, and it has been found that the following are useful curing agents for the type of epoxy resins defined above: dianhydrides such as pyromellitic dianhydride, cyclopentanetetracarboxylic dianhydride and benzophenonetetracarboxylic dianhydride; nonpolymeric amides such as dicyandiamide; s-triazine curing agents such as N,N-diallyl- melamine, hexamethoxymethylmelamine and melamine; blocked Lewis acids such as boron trifluoride monoethylamine and boron trifluoride piperidine; hydrazides such as carbohydrazide catalyzed with lead octoate and adipic acid dihydrazide; and novolac resins catalyzed with a catalyst such as benzyldimethylamine.

In addition to the foregoing two essential ingredients, the adhesive may contain a filler, a thixotropic agent, an anti-caking compound, and a color pigment. An anti-oxidant may also be added as is common in adhesive formulation. Typical fillers include, silica, quartz, magnesium silicate, alumina, zirconium oxide, zirconium silicate, carbonates, mica, aluminum silicate, aluminum powder, etc.; these are usually in the size range of 140–325 mesh. (All mesh sizes herein are given in terms of the U.S. Sieve Series size classifications.)

The following examples illustrate several adhesive compositions according to this invention. The term "parts" refers to parts by weight unless otherwise specified. Each composition was prepared by first pulverizing the solid epoxy resins to about 60 mesh, adding the other compounds (all of which are solids in the examples), and dry-blending the entire mixture in a ball mill for about 12–24 hours to achieve an intimate mixture of all the ingredients. the admixture was pulverized fine enough to pass through a 60 mesh screen. Other conventional mixing techniques can be used, but the foregoing dry-blending eliminates the problems associated with the application and drying of solvent solutions.

EXAMPLE 1

The first example demonstrates the use of a nonpolymeric amide (dicyandiamide) as a curing agent.

|  | Parts |
|---|---|
| (1) diglycidyl ether of bisphenol A with a molecular weight of 900 to 1,050 (Epi-Rez 520) | 2,000 |
| (2) diglycidyl ether of bisphenol A with a molecular weight of 4,000 to 5,000 (Epon 1007) | 500 |
| (3) alumina | 2,000 |
| (4) dicyandiamide | 140 |
| (5) stearic acid | 6 |
| (6) colloidal pyrogenic silica | 60 |

EXAMPLE 2

This example illustrates a dianhydride (BTDA with a stannous octoate catalyst) as a curing agent for the present adhesive systems.

|  | Parts |
|---|---|
| (1) diglycidyl ether of bisphenol A with a molecular weight of 900 to 1,050 (Epi-Rez 520) | 40 |
| (2) diglycidyl ether of bisphenol A with a molecular weight of 4,000 to 5,000 (Epon 1007) | 10 |
| (3) alumina | 40 |
| (4) 3,3',4,4' - benzophenonetetracarboxylic dianhydride (BTDA) | 9 |
| (5) stearic acid | 1.2 |
| (6) colloidal pyrogenic silica | 1.2 |
| (7) chromic oxide | 4.0 |
| (8) stannous octoate | 0.5 |

EXAMPLE 3

This example shows the use of a blocked Lewis acid (boron trifluoride monoethylamine) as the curing agent.

|  | Parts |
|---|---|
| (1) diglycidyl ether of bisphenol A with a molecular weight of 900 to 1,050 (Epi-Rez 520) | 40 |
| (2) diglycidyl ether of bisphenol A with a molecular weight of 4,000 to 5,000 (Epon 1007) | 10 |
| (3) alumina | 40 |
| (4) boron trifluoride monoethylamine | 2.8 |
| (5) stearic acid | 1.2 |
| (6) colloidal pyrogenic silica | 1.2 |
| (7) chromic oxide | 4.0 |

In the preceding compositions, the filler (shown in the examples as alumina) performs the functions of reducing the tackiness of the epoxy resins, imparting heat stability and increasing the adhesive strength of the composition. The stearic acid and silica both provide anti-caking, with the silica also acting as a thixotropic agent. The addition of a color pigment is illustrated with the chromic oxide in Examples 2 and 3; this provides the feature of increasing the identification of the adhesive coating on the ferrite article. The relative amounts of epoxy and filler in the adhesives can be varied within wide limits, as is typical of the adhesive formulating art. From about 30% to 70% epoxy resin is satisfactory, with 40% to 70% particularly effective. The filler content can be from 0 to 70%, depending on the wetting properties of the particular filler added to the composition. If a high molecular weight epoxy is used, little or no filler may be needed, but if lower molecular weight resins are used, a higher percentage of filler will help to reduce tackiness; also, lesser amounts of a high density filler would be used as compared to a low density filler. The amount of filler can help to produce a non-tacky coating (at room temperature) if the epoxy resin exhibits tackiness.

The above adhesive compositions were applied to ferrite magnets according to the following procedure. The ferrite magnets were preheated to a temperature between 220° F. to 280 F. The preheating temperature must be high enough so that the adhesive coating will melt sufficiently to adhere to the ferrite body, but not so high that the adhesive will cure to its fully-cured stage; the temperature range of 220° F. to 280° F. has proved satisfactory to accomplish these requirements. Further, for most applications, the adhesive coating should be about 4 to 10 mils thick, with a 6 to 8 mil thickness range being particularly preferred; the ferrite body is preheated in the upper end of the foregoing temperature range when a thicker coating is to be applied, and preheated at the lower end of the temperature range when thinner adhesive coatings are to be utilized. The dry, pulverized adhesive coating was dispensed onto a moving belt and metered to the desired thickness. The moving belt carrying the powdered adhesive then advanced past a transfer station at which the preheated ferrite articles were moved onto the belt to become coated with the adhesive, and thereafter removed from the belt; with the arc-shaped ferrite articles as shown in FIGS. 1–3, it was found useful to roll the ferrite across the powdered coating carried on the belt by holding the ferrite in a suitable fixture. When the preheated ferrite body contacts the powdered adhesive, the adhesive composition melts and becomes adhered to the ferrite article in the desired thickness. Next, the adhesive-coated ferrite bodies were rapidly cooled to room temperature by quenching with water. Rapid cooling to room temperature has been found important in order to prolong the pot life of the adhesive coating on the ferrite article. When numerous ferrite magnets are being coated with adhesive, there is considerable retained heat; quenching with a water spray has been found especially valuable to achieve rapid cooling of a large number of closely spaced adhesive-coated ferrites.

This method for the application of the adhesive compositions of this invention to ferrite magnets has proved especially useful to provide an adhesive coated ferrite article in which the adhesive is dry, non-tacky and in a partially-cured state at room temperature. The adhesive coated ferrites can be stored for up to one year before final assembly as described below. The adhesive is partially-cured, i.e. in the A-stage or B-stage, and is not to be converted to a completely-cured or C-stage thermoset adhesive until final assembly of the ferrite with other elements to form a magnetic unit.

Other application methods, however, can be employed. The dry-blended adhesive composition can be sprinkled onto a preheated ferrite article. Also, the adhesive coating can be dissolved in a suitable solvent and applied through a silk screen; this mode of application is particularly effective when it is desired to apply a discontinuous coating as shown in FIG. 4. The coating is then dried to remove the solvent and thereafter the coated ferrite article is water-quenched to room temperature to achieve the rapid cooling as specified above.

When producing magnetic assemblies as typified in FIGS. 2 and 5, the adhesive coated ferrite is first assembled with the other elements. For example, referring to FIG. 2, a pair of the magnetic segments are inserted inside the steel cylinder and a suitable expandable spacer element is positioned in the center of the assembly. The spacer element is designed to exert light mechanical pressure outwardly to cause the adhesive coating on each magnet to intimately contact the adjacent interior walls of the cylinder. To form a magnetic assembly as shown in FIG. 5, the two discs 20 and 21 are arranged on each side of the adhesive coated ferrite ring, and the entire unit is lightly clamped together.

It has been found that the adhesives of this invention will form high strength bonds when very light pressures on the order of 2 to 5 p.s.i. are employed in this type of assembly operation. It is critical to the accomplishment of the objectives of this invention that the adhesives be bondable to mild steel within a pressure range of 2 to 15 p.s.i. in order to prevent physical damage to the brittle, ceramic ferrite such as chipping or cracking.

Next, the entire assembly is heated to achieve a glue line temperature of about 300° F. to 500° F. The term "glue line temperature" refers to the temperature along the adhesive coating on the ferrite. The time necessary to achieve glue line temperatures within the preceding range will vary with the size and shape of the various elements in the magnetic assembly and the type of heating medium. The adhesive composition will melt to a low viscosity, thixotropic fluid when heated to the foregoing temperature range, and the adhesive will become converted to its completely-cured stage, or C-stage, upon curing for a suitable length of time to thereby form a thermoset adhesive composition forming a strong adhesive bond between the ferrite article and the magnetic steel elements of the magnetic assembly. The assembly should be held together while the adhesive is cured to its thermoset state. It has been found that the adhesives of this invention will become completely-cured within a few minutes, 2 to 5 minutes for example, when the upper portion of the glue line temperature range is used and within a few hours, e.g. 1 to 6 hours, at the lower portion of the glue line temperature range.

To demonstrate the effectiveness of the adhesive coated ferrite bodies of this invention to form satisfactory bonds with steel elements, rectangular ferrite articles were coated by the method described above with the adhesives of Examples 1–3 and bonded along one edge portion to strips of cold-rolled steel using the foregoing assembly technique. The tensile overlap shear strength of the bond between the ferrite and the steel strip was tested with a procedure similar to ASTM D1002–53T, modified so that a compressive load was applied to the ferrite body rather than the conventional tensile loading because the ferrite article has a comparatively low tensile strength and would therefore fail before the adhesive bond could be tested satisfactorily. The steel strip was gripped in the testing machine and a compressive load applied to the ferrite body with a C-shaped fixture to obtain the lap shear strength data for the adhesives of Examples 1–3 as reported in Table I.

TABLE I.—TENSILE OVERLAP SHEAR STRENGTH
[Ferrite to cold-rolled steel bonds at 75° F.]

| Adhesive | Strength, in p.s.i. | | |
|---|---|---|---|
| | Maximum | Minimum | Average |
| Example: | | | |
| 1 | 4,800 | 2,290 | 3,380 |
| 2 | 3,075 | 1,450 | 2,280 |
| 3 | 1,650 | 1,350 | 1,450 |

The above results represent the average of ten samples of each adhesive tested.

The preceding description has set forth a number of particular embodiments of adhesive coated ferrites according to the present invention in which ferrite magnetic bodies have an adhesive coating on at least one of their surfaces, which adhesive is to be bondable to magnetic steel upon application of heat and relatively low mechanical pressures. The ferrite adhesive coating of this invention is characterized in that it is a solid, dry, non-tacky at room temperature and partially-cured thermosetting adhesive incorporating a specified class of epoxy resins, comprising glycidyl ethers of bisphenols, and a suitable curing agent as basic or essential ingredients. The combination of two such epoxy resins as in the examples is advantageous in that the use of some higher molecular weight epoxy increases the flexibility of the adhesive composition. As stated in the above description, the adhesive coated ferrite articles can be stored for extended times of up to one year after the adhesive is applied and is in its partially-cured state. When it is desired to use the coated magnets in a final assembly, the application of further heat and pressure will convert the adhesive to its thermoset or C-stage and thereby form permanent adhesive bonds with elements such as magnetic steel components of a magnetic assembly. As compared to the prior art paste adhesives, the solid, non-tacky adhesive coated ferrites of this invention have the advantages of being easier to store, do not require equipment to apply adhesive at the final assembly point, and greatly facilitate final assembly with other elements. The adhesive coated ferrites of this invention show improved void filling and flow characteristics as compared to the usual prior art adhesive bonding film constructions, generally require much lower pressures to achieve the final adhesion, and also have a longer shelf life than most bonding film adhesives. Further, the coated ferrites of this invention can be stored at room temperature, do not require refrigeration during storage, and release paper liners are not needed between stacked coated magnets to prevent adhesion or blocking between them. The adhesive coatings of this invention are adhered directly to the ferrite body so that the adhesive is a homogeneous mass of the specified compositions, and does not incorporate a fabric or other stratum or carrier web in order to hold the adhesive on the ferrite body.

The adhesive coating on the ferrite body can be in either a continuous coating in which it entirely covers the surface of the ferrite body to which it is applied, or in the form of a discontinuous coating in which it only partially covers the ferrite surface to which it is applied. The discontinuous coating, as typified herein by the embodiment shown in FIG. 4, has discrete zones of adhesive separated by exposed portions of the ferrite surface to minimize the stresses applied to the ferrite body upon formation of the adhesive bond, and can thereby reduce or eliminate delamination or cracking of the ferrite body which will sometimes occur with a continuous adhesive coating.

A particularly useful process for applying the specified class of adhesives to a ferrite body has been described, wherein the adhesive is in the form of a dry blend and the ferrite article to be coated is preheated to a temperature range high enough to soften the adhesive so that it will be transferred to the ferrite but not so high as to cause complete cure of the adhesive to its thermoset stage.

The application of the adhesive is followed by rapid cooling to room temperature to preserve the shelf life of the finished coated article.

We claim:

1. As a new article of manufacture, a ferrite magnetic body and an adhesive coating on at least one surface thereof, wherein:
   the adhesive coating is a solid, dry, non-tacky and partially-cured thermosetting composition;
   the adhesive coating consists essentially of
   (1) an epoxy resin consisting of a diglycidyl ether of a bisphenol that is solid at room temperature and has a softening point of 40° C. or higher,
   (2) a curing agent for said epoxy resin, and
   (3) a filler sufficient to reduce tackiness and impart heat stability, and
   the adhesive coating is about 4 to 10 mils thick, curable to a fully-curable thermoset adhesive, and bondable to magnetic steel upon the application of heat and pressure of about 15 p.s.i. or less.

2. A coated ferrite article according to claim 1 wherein: the adhesive is in the form of a continuous coating covering the entire surface of the ferrite body to which it is applied.

3. A coated ferrite article according to claim 1 wherein: the adhesive is in the form of a discontinuous coating covering only portions of the surface of the ferrite body to which it is applied.

4. A coated ferrite article according to claim 1 wherein: the epoxy resin comprises the diglycidyl ether of bisphenol A, and
   the curing agent is a dianhydride, nonpolymeric amide, s-triazine, blocked Lewis acid, hydrazide, or novolac resin.

5. A coated ferrite article according to claim 2 wherein: the epoxy resin comprises the diglycidyl ether of bisphenol A, and
   the curing agent is a dianhydride, nonpolymeric amide, s-triazine, blocked Lewis acid, hydrazide, or novolac resin.

6. A coated ferrite article according to claim 3 wherein: the epoxy resin comprises the diglycidyl ether of bisphenol A, and the curing agent is a dianhydride, nonpolymeric amide, s-triazine, blocked Lewis acid, hydrazide, or novolac resin.

References Cited

UNITED STATES PATENTS

| | | | |
|---|---|---|---|
| 3,310,431 | 3/1967 | Loose | 117—21X |
| 3,279,945 | 10/1966 | Haines et al. | 117—234 |
| 3,349,060 | 10/1967 | Lewis et al. | 117—21X |
| 3,362,922 | 1/1968 | Manasia et al. | 117—21X |
| 3,377,183 | 4/1968 | Hurt et al. | 117—21X |

OTHER REFERENCES

Landrock: The Coating of Aluminum with Plastics by the Fluidized Bed and Electrostatic Powder Technique, pp. 81–84, October 1968.

WILLIAM D. MARTIN, Primary Examiner

B. D. PIANALTO, Assistant Examiner

U.S. Cl. X.R.

117—21